US012729303B2

(12) United States Patent
Verbeke et al.

(10) Patent No.: US 12,729,303 B2
(45) Date of Patent: Sep. 8, 2026

(54) CURABLE POLYURETHANE BASED RESIN FOR USE IN ADDITIVE MANUFACTURING

(71) Applicant: Huntsman International LLC, The Woodlands, TX (US)

(72) Inventors: Hugo Verbeke, Wilsele (BE); David Briers, Brussels (BE); Bram Vanroy, Haasrode (BE); Sandra Meynen, Tienen (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 1228 days.

(21) Appl. No.: 17/618,698

(22) PCT Filed: Jun. 11, 2020

(86) PCT No.: PCT/EP2020/066202

§ 371 (c)(1),
(2) Date: Dec. 13, 2021

(87) PCT Pub. No.: WO2020/249673

PCT Pub. Date: Dec. 17, 2020

(65) Prior Publication Data

US 2022/0243059 A1 Aug. 4, 2022

(30) Foreign Application Priority Data

Jun. 14, 2019 (EP) .................................... 19180267

(51) Int. Cl.

| | |
|---|---|
| ***C08L 75/16*** | (2006.01) |
| ***B29C 64/129*** | (2017.01) |
| ***B29C 64/264*** | (2017.01) |
| ***B29K 75/00*** | (2006.01) |
| ***B33Y 10/00*** | (2015.01) |
| ***B33Y 70/00*** | (2020.01) |
| ***B33Y 80/00*** | (2015.01) |

(52) U.S. Cl.
CPC ............ *C08L 75/16* (2013.01); *B29C 64/129* (2017.08); *B29C 64/264* (2017.08); *B33Y 10/00* (2014.12); *B33Y 70/00* (2014.12); *B33Y 80/00* (2014.12); *B29K 2075/00* (2013.01)

(58) Field of Classification Search
CPC ..... C08L 75/16; B29C 64/129; B29C 64/264; B33Y 10/00; B33Y 70/00; B33Y 80/00; B29K 2075/00; C08G 18/4845; C08G 18/4854; C08G 18/672; C08G 18/7671; C09D 175/16; C08F 283/008; C08F 2/48; C08F 2/54
See application file for complete search history.

(56) References Cited

U.S. PATENT DOCUMENTS

2003/0092820 A1 5/2003 Schmidt et al.
2011/0003944 A1* 1/2011 Bleys ................ C08G 18/2865
525/452

FOREIGN PATENT DOCUMENTS

WO 1995/013565 5/1995
WO 2012/004088 1/2012
WO 2019/103855 5/2019

OTHER PUBLICATIONS

International Search Report and Written Opinion received in corresponding PCT Application PCT/EP2020/066202, completed Oct. 2, 2020 and mailed Oct. 12, 2020.

* cited by examiner

*Primary Examiner* — Jessica M Roswell

(57) ABSTRACT

A liquid curable polyurethane based resin comprising a) polyurethane compounds which are functionalized with reactive ethylenically unsaturated moieties, b) at least one reactive diluent compound having at least one ethylenically unsaturated functional group and c) at least one photoinitiator for making polymerized/cured polyurethane based materials having elongation at break values of >100%, preferably >125%, most preferably >150% and a tensile strength of >5 MPa, more preferably >7 MPa, most preferably >10 MPa (both measured according to DIN 53504 S2).

27 Claims, 5 Drawing Sheets

CURABLE POLYURETHANE BASED RESIN FOR USE IN ADDITIVE MANUFACTURING

CROSS-REFERENCE TO RELATED APPLICATIONS

Figure 1:
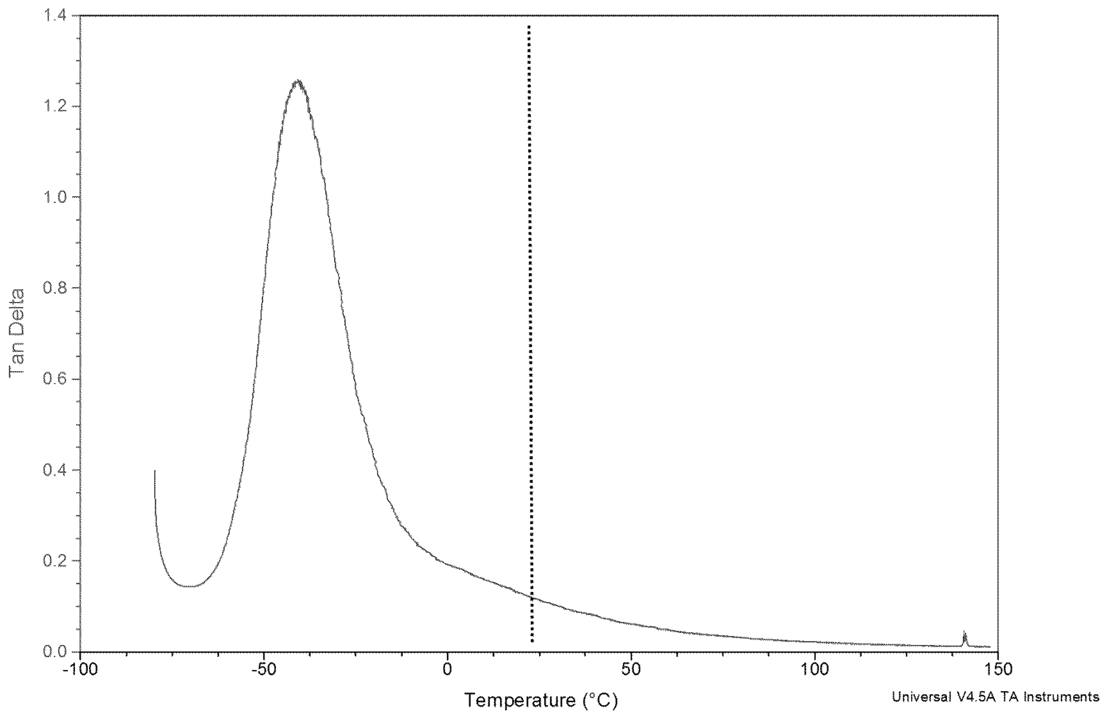

This application is the National Phase of International Application PCT/EP2020/066202 filed Jun. 11, 2020 which designated the U.S. and which claims priority to European Provisional No. 19180267.7 filed Jun. 14, 2019. The noted applications are incorporated herein by reference.

FIELD OF INVENTION

The present invention relates to a liquid curable resin which comprises cross-linkable polyurethane polymers which are end-capped with UV and/or heat induced polymerizable moieties and a reactive diluent for use in a 3-dimensional (3D) printing device according to the invention, preferably in a 3D stereolithographic (SLA) process and the conversion of the curable resin into a thermoset elastomeric polymer thereby forming 3D printed objects.

The present invention further relates to an improved and more robust 3D printing process for making 3D objects with improved elongation and tensile strength.

BACKGROUND OF THE INVENTION

Three-dimensional (3D) printing is an additive printing process used to make three-dimensional solid objects from a digital model. 3D printing is often used in rapid product prototyping, mold generation, and mold master generation. 3D printing techniques are considered additive processes because they involve the application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using UV laser and/or digital light projection technology.

Additive manufacturing processes utilize various materials and process techniques in order to build up objects in layers. In fused deposition modelling (FDM), for example, a thermoplastic polymer wire is liquefied and deposited in layers by means of a nozzle on a movable building platform. On solidification, a solid object is formed. Control of the nozzle and the building platform is done on the basis of a Computer-Aided Design (CAD) drawing of the object. If the geometry of this object is complex, e.g. with geometric undercuts, support materials have to be additionally printed and removed again after the object has been finished.

Stereolithographic (referred to as SL or SLA) 3D printing is an additive manufacturing process which is liquid based in order to build up objects in layers. In Stereolithographic Apparatus (SLA), an object is created by selectively curing a polymer resin layer-by-layer using an ultraviolet (UV) laser beam. The materials used in SLA are curable photosensitive polymers that come in a liquid form.

SLA has been established in industry for many years and is utilized mainly for producing prototypes with complex geometries. The possibility of creating 3D printed objects with high precision and very smooth surface finish makes SLA ideal for creating visual prototypes. Despite its advantages the method suffers from the fact that currently the SLA printed parts are generally brittle and not suitable for making functional prototypes. In other words, the 3D objects achieved using SLA based 3D printing techniques usually have good tensile strength (TS) properties but suffer from insufficient elongation. Therefore, they are more brittle and are mostly used for prototyping and not for consumer items and/or industrial production. In some cases the issue of low elongation is solved, but at the cost of tensile strength and the parts are no longer strong enough for the wear and tear of consumer items and no longer suitable in an industrial production process. In exceptional cases, SLA based 3D printing techniques produce 3D objects where both tensile strength and elongation are sufficient, but these are based on the mixing of 2 components during printing which gives serious drawbacks with respect to potlife (reduced), recyclability (almost impossible), total printing time restrictions, postcuring (extensive) thereby limiting highly the printing technique.

For the reasons above indicated there is a need to improve the SLA based 3D printing technique and/or the curable polymer resins used in the SLA based 3D printing technique further such that a more robust process is developed leading to 3D printed objects for producing 3D elastomers having both good tensile strength and good elongation properties.

AIM OF THE INVENTION

It is a goal of the invention, to develop a radically curable composition for use in a Stereolithographic (SLA) based 3D printing technique in order to make 3D printed articles with improved mechanical properties and allowing the use of said 3D printed articles for consumption instead of prototyping.

It is a goal of the invention to develop a liquid curable polymer resin for making a cured polyurethane comprising elastomer having both good tensile strength and good elongation properties.

It is a further goal of the invention to develop a liquid curable polymer resin which improves an SLA based 3D printing technique such that the 3D printed object has both good tensile strength and elongation properties.

DEFINITIONS AND TERMS

In the context of the present invention the following terms have the following meaning:

1) The isocyanate index or NCO index or index is the ratio of NCO-groups over isocyanate-reactive hydrogen atoms present in a formulation, given as a percentage:

$$\frac{[NCO] \times 100\ (\%)}{[\text{active hydrogen}]}$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is not only considered from the point of view of the actual polymerisation process preparing the material involving the isocyanate ingredients and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are also taken into account in the calculation of the isocyanate index.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) The term "average hydroxyl functionality" (or in short "functionality") is used herein to indicate the number average functionality (number of hydroxyl groups per molecule). Regarding the polyol or polyol composition it is the assumption that this is the number average functionality (number of active hydrogen atoms per molecule) of the initiator(s) used in their preparation although in practice it will often be somewhat less because of some terminal unsaturation.

4) The term "average functionality" (or in short "functionality") is used herein to indicate the number average functionality (number of specific type of functional groups per molecule such as acrylic functional groups).

5) The term "hard block content" of a material refers to 100 times the ratio of the amount (in pbw) of polyisocyanate+isocyanate-reactive compounds having a molecular weight of 500 or less (wherein polyols having a molecular weight of more than 500 incorporated in the polyisocyanates are not taken into account) over the amount (in pbw) of all polyisocyanate+all isocyanate-reactive compounds used in making the material. Typically the compounds having a molecular weight of 500 or less are referring to the chain extender, chain stopper and isocyanate compounds used. The hard block content is expressed in %.

6) The word "average" refers to number average unless indicated otherwise.

7) "Liquid" means having a viscosity of less than 15 Pa·s measured according to ASTM D445-11a at a given temperature (such as room temperature, processing and/or printing temperature).

8) The term "room temperature" refers to temperatures of about 20° C., this means referring to temperatures in the range 18° C. to 25° C. Such temperatures will include, 18° C., 19° C., 20° C., 21° C., 22° C., 23° C., 24° C., and 25° C.

9) The term "elastomer" or "material having elastomeric properties" refers to a material that will resume its original shape after being deformed and they can be stretched many times and will then elastically recover to their original shape when released.

10) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

11) The term "polyurethane based resin", as used herein refers to a resin comprising at least 50% wt %, preferably 50 to 85 wt % functionalized polyurethane compounds calculated on the total weight of the resin.

12) The term "thermoplastic" as used herein refers in its broad sense to designate a material that is reprocessable at an elevated temperature, whereas "thermoset" designates a material that exhibits high temperature stability without such reprocessability at elevated temperatures.

13) The term "urea group free" is used herein to design a polymer backbone with less than 0.1% free urea groups available for reaction with other molecules. Similarly, the terms isocyanurate free and oxazolinyl free are used to design a polymer backbone with less than 0.1% free isocyanurate or oxazolinyl groups available for reaction with other molecules. As used herein the term "pendant group free" is used to design a polymer backbone having less than 0.01% of pendant groups containing polymerizable double bonds.

14) The term "actinic radiation" is used herein to refer to radiation capable of initiating photochemical reactions. It includes but is not limited electromagnetic radiation of different wavelength such as, but not limited to, UV and visible light. Electron beams (EB) are also capable of initiating photochemical reactions and therefore also fall under the definition of actinic radiation.

15) Stereolithographic printing (SLA, SL) is a form of 3D printing technology for the production of 3D objects in a layer by layer fashion using photochemical (actinic chemical) processes by which light causes chemical monomers in a liquid polymer resin to link (cure) together to form polymers. A light source (laser, UV light, visible light, . . . ) is used as the power source to cure a liquid polymer resin aiming the light source automatically at points in space defined by a 3D model, and fusing the material together to create a solid structure. Alternative abbreviations used in industry for this type of 3D printing technique thereby are DLP (Digital Light Processing or Digital Light Projector), LCD (Liquid Crystal Display), CDLP (Continuous Digital Light Processing), CLCD (Continuous Liquid Crystal Display) and CLIP (Continuous Liquid Interphase Printing and/or Continuous Light Induced Processing and/or Continuous Light Induced Polymerization). All these techniques, and techniques derived therefrom, are falling in the scope of the invention for the use of the curable polyurethane-based resin according to the invention.

16) Cross-linkable polyurethane based resin or curable polyurethane based resin according to the invention refers to a liquid resin comprising a) polyurethane polymer compounds which are functionalized and/or end-capped with reactive ethylenically unsaturated moieties preferably selected from acrylate and/or methacrylate compounds and b) a reactive diluent.

17) The "glass transition temperature" ($T_g$) refers to the temperature at which a reversible transition from a hard glass condition into a rubber-elastic condition occurs. The glass transition temperature ($T_g$) is measured according to ISO 6721-4, with a forced constant amplitude and a fixed frequency using a tensile clamp. The peak maximum of the Tangent Delta (tan d) profile over a range of temperatures (plot tan d in function of temperature) is taken as the $T_g$ resulting from a Dynamic Mechanical Thermal Analysis (DMTA or in short DMA) with following preferred settings: 3° C./min, F=1 Hz and Amp=30 or 50 μm (respectively for a 3D printed sample or a thin film).

18) Tensile strength refers to the maximum stress the material can withstand before it breaks. Unless otherwise specified, tensile strength is measured according to DIN53504 S2 (100 mm/min) and expressed in kPa or MPa.

19) Elongation is measured by applying tensile force or stretching the material and determining the change in length from original. Elongation is expressed as a percentage of the original length. Ultimate elongation is the percentage change in length from original to rupture. Unless otherwise specified, elongation is measured according to DIN53504 S2 (100 mm/min) and is expressed in %.

20) Molecular Weight (MW) as used herein refers to the number average molecular weight (unless otherwise specified) and is expressed in g/mol. In the case of the functionalized polyurethane compounds, the MW as indicated herein is based on the theoretical calculated MW.

21) Loss Tangent or Tan delta (Tan δ) is the tangent of the phase angle obtained from a Dynamic Mechanical Analysis (DMA) measurement. Tan δ is the ratio of the loss modulus E" to the storage modulus E' (tan δ=E"/E') and is a measure of the dampening ability of the material. Typically, materials with a very low tan δ at the application temperature are very good at returning energy (low dampening).

22) Dynamic Mechanical Analysis (DMA) or Dynamic Mechanical Thermal Analysis (DMTA) as used herein is performed in accordance with ISO 6721-4:2019 using a tensile clamp and a TA Q800 apparatus. A frequency of 1 Hz and heating rate of 3° C./min is used over a temperature range from −80° C. to 150° C. In the measurement procedure the force track is set to 125% and the Poisson's ratio is set to 0,44. Depending on the sample type the following parameters (sample dimension and amplitude) are used:
   Thin film: sample thickness between 0,1-1,0 mm and sample width of 5,3 mm. The Amplitude of the measurement is set to 50 micrometer.
   3D printed sample: sample thickness between 1,5-5,0 mm and sample width of 4,0-7,0 mm. The Amplitude of the measurement is set to 30 micrometer (30 μm).

The basic properties obtained from a DMA (DMTA) test include storage modulus (E'), loss modulus (E") and Tan delta (tan δ), which is the ratio of loss modulus to storage modulus (E"/E'). Furthermore, the glass transition temperature(s) (Tg) can be determined as the peak(s) (maxima) in a Tan delta plot over a range of temperatures.

23) The expression "Phase separating compounds" refers to at least 2 compounds having limited solubility with each other in the uncured (liquid) and/or partially cured (viscous liquid) and/or cured (solid) state. The phase separation, resulting from the limited solubility or mixability can, for example, be estimated from the Hildebrand solubility parameters and/or Hansen solubility parameters. For example a sufficient difference in polarity (hydrophobic versus hydrophilic, slightly hydrophilic versus strongly hydrophilic, . . . ) can result in phase separation. In some cases the limited solubility or mixability can result in the coexistence of 2 phases with each their distinct glass transition temperature and/or melting/crystallization temperature as determined by a DMA measurement. In the most preferred case they both exhibit a thermal "transition" at a different temperature with a difference of at least 10° C. Most preferably both thermal transitions are glass transition temperatures.

24) The expression "hydrophobic" compounds or compounds having hydrophobic properties refers to compounds that only have limited polarity up to compounds that are completely nonpolar. It is well understood by those of ordinary skill in the art that some compounds can be more hydrophobic than others and that the hydrophobicity can in most cases be estimated from the Hansen Solubility parameters. These hydrophobic compounds in general have limited solubility in water <100 g/L, preferably <1 g/L, more preferably <0.01 g/L at 20° C. In some cases "hydrophobic", "hydrophobicity" or "hydrophobic character" means that a water droplet placed on the surface of a hydrophobic material forms a contact angle greater than 90° using the drop shape method of contact angle measurement.

25) The expression "hydrophilic" compounds or compounds having hydrophilic properties refers to compounds which are soluble in water or compounds having a minimal amount of polarity. It is well understood by those of ordinary skill in the art that the Hansen solubility parameters can be used to estimate the degree of hydrophilicity. In some cases hydrophilic properties refers to compounds which are highly soluble in water. In some cases hydrophilicity or "hydrophilic character" refers to water attractive properties with a water contact angle <90°. In that sense, "hydrophilic", "hydrophilicity" or "hydrophilic character" means that a water droplet placed on the surface of a hydrophilic material forms a contact angle smaller than 90° using the drop shape method of contact angle measurement.

26) "Reactive diluent" and "Reactive diluent compounds" as used herein refers to compounds which are used in combination with the functionalized polyurethane compounds in the liquid curable (cross-linkable) polyurethane based resin of the invention with the advantage that the reactive diluent compounds are low molecular weight compounds (in comparison to the functionalized polyurethane compounds) with at least one ethylenically unsaturated functional group that often have a low viscosity (in comparison to the functionalized polyurethane compounds). The reactive diluent compounds lie dormant during initial processing, but which polymerize if subjected to appropriate polymerization conditions during processing (in the current invention referring to printing the 3D object) e.g. by selectively applying energy to the curable polyurethane based resin leading to solidification of the resin via the actinic route, including UV, visible light and electron beam (EB) radiation.

27) The expression "Temperature of use" and "$T_{use}$" refer to the temperature at which the cured resin according to the invention is used. For consumer goods this is usually around room temperature but this might differ depending on the intended application of use.

28) The expression "Processing Temperature", "Printing Temperature", "Curing temperature" and "$T_p$" refer to the temperature at which the liquid curable (photopolymerizable) polyurethane based resin according to the invention is applied to make cured materials such as 3D printed objects, cured films, coatings, adhesives, seals . . . . In other words, it refers herein to the temperature at which the material is exposed to the actinic radiation required for photopolymerization. For SLA printed objects, the processing temperature used to cure the curable polyurethane based resin according to the invention is around room temperature, alternatively a commonly used processing temperature is around 35° C. or even higher processing temperatures up to 60° C., 65° C. and up to 120° C.

29) The expressions "curable resin" and "photopolymerizable resin" are interchangeable terms within the invention and both refer to a resin which is polymerizable by exposure to actinic radiation.

30) The expressions "cured resin" and "polymerized resin" are interchangeable terms within the invention and both refer to a resin which is polymerized fully or at least partly by exposure to actinic radiation.

31) The expression "distinctive peaks" refers to peaks in a plot which are well separated from each other such that there is a minimum (valley) in between the peaks which is well below the maximum of the peaks. The cured resins according to the invention have at least 2 distinctive peaks in the Tan delta plot as measured by DMA over a range of temperatures and said peaks are well separated in temperature in such a way that a minimum occurs for which a temperature T can be found with $T_{g1}<T<T_{g2}$, where the Tan delta (T)<Tan delta ($T_{g1}$) and the Tan delta (T)<Tan delta ($T_{g2}$).

32) The term "deblockable isocyanate group" refers to a blocked isocyanate group where the blocking group, under suitable conditions, can either (i) disassociate to liberate a free (or unblocked) isocyanate group or (ii) be displaced or replaced by another group or component. Blocked isocyanates are reaction products of isocyanates with, for example, highly hindered alcohols, highly hindered amines, phenols, oximes, lactams, dicarbonyl compounds, hydroxamates, bisulfite addition compounds, hydroxylamines and esters of p-hydroxybenzoic acid and salicylic acid, which at higher temperature dissociate to reform the original isocyanate group. An example of a non-deblockable isocyanate group is a blocked isocyanate group where the blocking group, under suitable curing conditions, does not disassociate to liberate a free isocyanate group or is not readily displaced or replaced by another group or component.

It should be clear that the term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

The expressions parts and percentages are referring to parts and percentages by weight unless otherwise indicated.

DETAILED DESCRIPTION

It is a goal of the invention to provide a liquid photopolymerizable (curable) polymer resin such that after curing said resin, cured materials such as three dimensional (3D) printed objects are achieved having both good tensile strength and good elongation properties. More in particular 3D objects are aimed that have elongation at break values of >100%, preferably >150% and a tensile strength of >5 MPa, preferably >10 MPa.

It is a further goal of the invention to improve the SLA based 3D printing technique thereby using a liquid photopolymerizable polyurethane based resin such that 3D printed objects are achieved having both good tensile strength and elongation properties. More in particular 3D printed objects are aimed that have elongation at break values of >100%, preferably >150% and a tensile strength of >5 MPa, preferably >10 MPa.

The goal is achieved by using a liquid photopolymerizable (curable) polyurethane based resin comprising a) polyurethane compounds which are functionalized with reactive ethylenically unsaturated moieties, b) at least one reactive diluent compound having at least one ethylenically unsaturated functional group and c) further comprising at least one photo-initiator the amount and choice of functionalized polyurethane compounds and reactive diluent compounds is such that by exposing actinic radiation to the liquid resin, phase separation occurs during photopolymerization of the resin and wherein

- At least 70 wt % of the functionalized polyurethane compounds (calculated on the total weight of all functionalized polyurethane compounds in the resin) and at least 50 wt % of the reactive diluent compounds (calculated on the total weight of all reactive diluent compounds in the resin) are behaving as phase separating compounds in the polymerized/cured state of the resin resulting in at least 2 glass transition temperatures ($T_{g1}$ and $T_{g2}$) resulting in at least 2 distinctive peaks in Tan delta as measured by Dynamic Mechanical Analysis (DMA) according to ISO 6721-4 on the polymerized/cured state of the resin,
- At least 70 wt % of the functionalized polyurethane compounds (calculated on the total weight of all polyurethane compounds in the resin) correspond to a first peak of the at least 2 distinctive peaks and have a glass transition temperature $T_{g1}$ in the polymerized (cured) state of the resin,
- At least 50 wt % of the reactive diluent compounds (calculated on the total weight of all reactive diluent compounds in the resin) correspond to a second peak of the at least 2 distinctive peaks and have a glass transition temperature $T_{g2}$ in the polymerized (cured) state of the resin,
- $T_{g2}-T_{g1}$ ($\Delta T_g$) is at least 20° C., more preferably 50° C. and most preferred 100° C., and
- $T_{g2}$ is above the temperature of use ($T_{use}$) of the polymerized/cured resin According to embodiments, at least 50 wt % of the reactive diluent compounds (calculated on the total weight of all reactive diluent compounds in the resin) in the resin have a glass transition temperature $T_{g2}$ in its polymerized (cured) state above the temperature of use ($T_{use}$) of the polymerized (cured) resin, more preferably $T_{g2}$ is above room temperature.

According to embodiments, the at least 2 distinctive peaks in the Tan delta plot as measured on the polymerized (cured) resin by DMA over a range of temperatures are well separated in temperature in such a way that a valley (minimum) occurs for which a temperature $T_{min}$ can be found with $T_{g1}<T_{min}<T_{g2}$, where the Tan delta ($T_{min}$)<Tan delta ($T_{g1}$) and the Tan delta ($T_{min}$)<Tan delta ($T_{g2}$) and wherein Tan delta ($T_{min}$) corresponds to the lowest Tan delta that can be found for $T_{g1}<T_{min}<T_{g2}$. The difference in Tan delta measured at $T_{g1}$ and the Tan delta measured at the minimum ($T_{min}$) expressed as $\Delta$ Tan delta$_{Tg1-Tmin}$ as well as the difference in Tan delta measured at $T_{g2}$ and the Tan delta measured at the minimum ($T_{min}$) expressed as $\Delta$ Tan delta$_{Tg2-Tmin}$ should be >0.001, preferably >0.005, more preferably 0.01, most preferably >0.05.

According to embodiments, the Tan delta as measured on the polymerized (cured) resin by DMA at the temperature of use (temperature at which the polymerized (cured) resin will be used) is <1, preferably <0.6, more preferably <0.5, most preferably <0.4. In preferred embodiments, the Tan delta as measured on the polymerized (cured) resin by DMA is <0.3, <0.2 and <0.15.

According to embodiments, the processing temperature ($T_p$) of the photopolymerizable resin is at least above $T_{g1}$ and preferably below $T_{g2}$.

According to embodiments, the temperature of use ($T_{use}$) of the polymerized resin is at least above $T_{g1}$ and preferably below $T_{g2}$.

According to embodiments, the temperature of use ($T_{use}$) of the polymerized resin and the processing temperature ($T_p$) of the photopolymerizable resin is at least above $T_{g1}$ and preferably below $T_{g2}$.

According to embodiments, the processing temperature ($T_p$) of the resin is above $T_{g1}$ and above $T_{g2}$.

According to embodiments, at least 70 wt % of the polyurethane compounds (calculated on the total weight of all functionalized polyurethane compounds in the resin) and at least 50 wt % of the reactive diluent compounds (calculated on the total weight of all reactive diluent compounds in the resin) are behaving as phase separating compounds resulting in at least 2 distinctive peaks, preferably ≤3, most preferably 2 distinctive peaks in Tan delta in function of temperature as measured by Dynamic Mechanical Analysis (DMA) according to ISO 6721-4 in the polymerized (cured) state.

According to embodiments, the at least 2 distinctive peaks in Tan delta plot as measured by DMA give rise to a reaction product having at least two different phases: (1) a relatively soft phase, and (2) a relatively harder phase. Such materials may exhibit at least two different glass transition temperature peaks when referring to the DMA (dynamic mechanical analysis) and exhibit a phase-separated morphology in which a combined glass-rubber state is realized over a range of temperatures. With the presence of distinct glass transition temperatures, a rubbery phase that has already transitioned from a brittle glassy phase into a rubber state and a brittle glassy phase that is yet to transition into a rubbery state co-exist. This may provide for enhanced properties when used for three-dimensional printing of flexible objects. For example, the presence of a rubbery phase allows for a material that is deformable and the presence of a rigid glassy phase provides a reinforcing mechanism that provides for sufficient Shore A hardness, increases tensile strength, and/or increases mechanical integrity (such as storage modulus) of the material.

According to embodiments, at least 70 wt %, preferably at least 80 wt %, more preferably at least 90 wt % of the functionalized polyurethane compounds (calculated on the total weight of all functionalized polyurethane compounds in the resin) and at least 60 wt %, preferably at least 70 wt %, more preferably at least 80 wt %, most preferably at least 90 wt % of the reactive diluent compounds (calculated on the total weight of all reactive diluent compounds in the resin) are behaving as phase separating compounds that have limited solubility with each other in the unpolymerized (uncured) and/or partially unpolymerized (partly cured) and/or (fully) polymerized (cured) state.

According to embodiments, the liquid photopolymerizable (curable) polyurethane based resin of the invention is comprising polyurethane compounds which are functionalized with reactive ethylenically unsaturated moieties, at least one reactive diluent compound having at least one ethylenically unsaturated functional group and further comprising at least one photo-initiator and wherein

- At least 70 wt % of the functionalized polyurethane compounds (calculated on the total weight of all polyurethane compounds in the resin) exhibit hydrophobic properties in the unpolymerized (uncured) and/or partially polymerized (partly cured) and/or polymerized (cured), and at least 50 wt % of the reactive diluent compounds (calculated on the total weight of all reactive diluent compounds in the resin) exhibit hydrophilic properties in the uncured and/or partially polymerized (partly cured) and/or polymerized (cured) state, and
- At least 70 wt % of the functionalized polyurethane compounds (calculated on the total weight of all polyurethane compounds in the resin) have a glass transition temperature ($T_{g1}$) in its polymerized/cured state which is below the glass transition temperature ($T_{g2}$) of at least 50 wt % of the reactive diluent compounds (calculated on the total weight of all reactive diluent compounds in the resin) in its polymerized/cured state, and
- $T_{g2}-T_{g1}$ ($\Delta T_g$) is at least 20° C., more preferably 50° C. and most preferred 100° C., and
- $T_{g2}$ is above the temperature of use of the polymerized/cured resin According to embodiments, the liquid photopolymerizable/curable polyurethane based resin of the invention is comprising polyurethane compounds which are functionalized with reactive ethylenically unsaturated moieties, at least one reactive diluent compound having at least one ethylenically unsaturated functional group and further comprising at least one photo-initiator and wherein

- At least 70 wt % of the functionalized polyurethane compounds (calculated on the total weight of all polyurethane compounds in the resin) exhibit hydrophilic properties in the unpolymerized/uncured (liquid) and/or partially cured (viscous liquid) and/or cured (solid) state, and at least 50 wt % of the reactive diluent compounds (calculated on the total weight of all reactive diluent compounds in the resin) exhibit hydrophobic properties in the unpolymerized (uncured) and/or partially polymerized (partially cured) and/or polymerized (cured) state, and
- At least 70 wt % of the functionalized polyurethane compounds (calculated on the total weight of all polyurethane compounds in the resin) have a glass transition temperature ($T_{g1}$) in its polymerized (cured) state which is below the glass transition temperature ($T_{g2}$) of at least 50 wt % of the reactive diluent compounds (calculated on the total weight of all reactive diluent compounds in the resin) in its polymerized (cured) state, and
- $T_{g2}-T_{g1}$ ($\Delta T_g$) is at least 20° C., more preferably 50° C. and most preferred 100° C., and
- $T_{g2}$ is above the temperature of use of the polymerized (cured) resin According to embodiments, $T_{g2}$ is above the temperature of use of the polymerized (cured) resin ($T_{g2}>T_{use}$), preferably $T_{g2}$ is 10° C. higher than the temperature of use of the polymerized (cured) resin ($T_{g2}>T_{use}+10°$ C.), more preferably $T_{g2}$ is 20° C. higher than the temperature of use of the polymerized (cured) resin ($T_{g2}>T_{use}+20°$ C.), more preferably $T_{g2}$ is 30° C. higher than the temperature of use of the polymerized (cured) resin ($T_{g2}>T_{use}+30°$ C.), even more preferably $T_{g2}$ is 40° C. higher than the temperature of use of the polymerized (cured) resin ($T_{g2}>T_{use}+40°$ C.), most preferably $T_{g2}$ is 50° C. higher than the temperature of use of the polymerized (cured) resin ($T_{g2}>T_{use}+50°$ C.).

According to embodiments, at least 70 wt %, preferably at least 80 wt, more preferably at least 90 wt % of the functionalized polyurethane compounds (calculated on the total weight of all functionalized polyurethane compounds in the resin) in the liquid photopolymerizable/curable polyurethane based resin are end-capped with reactive ethylenically unsaturated moieties.

According to embodiments, all of the functionalized polyurethane compounds in the liquid photopolymerizable/curable polyurethane based resin are end-capped with reactive ethylenically unsaturated moieties.

According to embodiments, the liquid curable polyurethane based resin composition comprises at least 50 wt %, preferably 50 to 85 wt % of functionalized polyurethane compounds calculated on the total weight of all compounds in the photopolymerizable/curable resin.

According to preferred embodiments, the liquid photopolymerizable/curable polyurethane based resin composition comprises 15 up to 50 wt %, preferably 20 up to 45 wt %, more preferably 25 up to 35 wt % of reactive diluent compounds calculated on the total weight of all compounds in the photopolymerizable/curable resin.

According to embodiments, the viscosity of the liquid photopolymerizable/curable polyurethane based resin at processing (exposure to actinic radiation) temperature ($T_p$) is below 15 Pa·s, preferably below 10 Pa·s, more preferably below 8 Pa·s. In some preferred embodiments, the viscosity of the liquid photopolymerizable/curable polyurethane based resin at processing (exposure to actinic radiation) temperature ($T_p$) is below 5 Pa·s.

According to embodiments, the liquid photopolymerizable/curable polyurethane based resin of the invention may optionally comprise further additives and/or auxiliaries such as catalysts, surfactants, flame proofing agents, fillers, pigments, stabilizers, dyes, UV absorbers, plasticizers, radical initiators, colorants, anti-oxidants, . . . . The further additives may be each present from more than 0 up to 10 parts by weight, preferably from more than 0 up to 5 parts by weight calculated on the total weight of the resin.

According to embodiments, the liquid photopolymerizable/curable (cross-linkable) polyurethane based resin of the invention may comprise at least one thermal crosslinking initiator. Examples of suitable thermal crosslinking initiators are organic peroxides such as dicumylperoxide, 2,5-dimethyl-2,5-di(tert.-butyl)peroxide, 2,5-Bis(tert.-butylperoxide)-2,5-dimethyl-3-hexyne, di-tert.-butylperoxide, 2,5-Bis (tert.-butylperoxide)-2,5-dimethyl-hexane, Bis(tert.-butylperoxyisopropyl)benzene, m-octadexylazoformate and tert.-butyl peroxycumene. A preferred cross-linker is 2,5-Bis (tert.-butylperoxide)-2,5-dimethyl-hex ane.

According to embodiments, the liquid photopolymerizable/curable (cross-linkable) polyurethane based resin of the invention is cured via the actinic route, including UV and visible light radiation and the resin comprises at least one photo initiators suitable as UV crosslinking initiators. Typical UV initiators comprise ketones such as 1-hydroxycyclohexylphenylketone, 2,2-dimethoxy-1,2-diphenylethan-1-one, 1-[4-(2-hydroxyethoxy)-phenyl]-2-methyl-1-prop anone (HHPMP), Benzophenone, 4-phenylbenzophenone, Methylbenzoylformate, and (bis)acylphosphineoxides such as bis(2,4,6-trimethylbenzoyl)-phenyl-phosphoneoxide (BTPPO), 2,4,6-Trimethylbenzoyldiphenylphosphine oxide, Ethyl(2,4,6-trimethylbenzoyl) phenylphosphinate.

According to embodiments, the liquid photopolymerizable/curable (cross-linkable) polyurethane based resin of the invention comprises at least one photo crosslinking initiator and optionally one thermal initiator. The initiator is preferably present in the resin in a concentration of 0.01 wt % up to 10 wt % calculated on the total weight of the resin. A preferred concentration might be in the range 0.1 wt % up to 5 wt %, more preferably in the range 0.5 wt % up to 2 wt % calculated on the total weight of the resin.

According to embodiments, at least 60 wt % of the functionalized polyurethane compounds (calculated on the total weight of all polyurethane compounds in the resin) have a number average molecular weight in the range of 3000-12000 g/mol, preferably in the range 3500-12000 g/mol; more preferably in the range 4000-12000 g/mol; most preferably in the range 4500-12000 g/mol.

According to embodiments, preferably at least 70 wt %, more preferably at least 80 wt %, most preferably at least 90 wt % of the functionalized (end-capped) polyurethane compounds (calculated on the total weight of all polyurethane compounds in the resin) have a number average molecular weight in the range of 3000-12000 g/mol, preferably in the range 3500-12000 g/mol; more preferably in the range 4000-12000 g/mol; most preferably in the range 4500-12000 g/mol.

According to embodiments, preferably at least 70 wt %, more preferably at least 80 wt %, most preferably at least 90 wt % of the functionalized (end-capped) polyurethane compounds (calculated on the total weight of all polyurethane compounds in the resin) have a number average molecular weight preferably in the range of 5000-12000 g/mol; more preferably in the range of 5000-11000 g/mol, most preferably in the range of 5000-10000 g/mol.

According to embodiments, preferably at least 70 wt %, more preferably at least 80 wt %, most preferably at least 90 wt % of the functionalized (end-capped) polyurethane compounds (calculated on the total weight of all polyurethane compounds in the resin) have a number average molecular weight preferably in the range 4000-9000 g/mol; more preferably in the range of 5000-8000 g/mol.

The invention comprises an approach wherein molecular redesign of the polyurethane matrix is realized by using a polyurethane based resin mixture comprising curable compounds with opposite polarities (hydrophobic versus hydrophilic).

According to one embodiment, the functionalized (end-capped) polyurethane compounds exhibit hydrophobic properties while the reactive diluent compounds exhibit hydrophilic properties. In another embodiment, the functionalized (end-capped) polyurethane compounds exhibit hydrophilic properties while the reactive diluent compounds exhibit hydrophobic properties. The molecular redesign of the polyurethane matrix is in both cases realized during curing (exposure of the liquid curable/cross-linkable polyurethane based resin to a curing/cross-linking treatment) leading to an object having at least 2 distinctive phases measured by DMTA. The result is a reorganization of the polymer chains leading to phase-separation.

According to embodiments, at least 70 wt %, more preferably at least 80 wt %, most preferably at least 90 wt % of the functionalized (end-capped) polyurethane compounds (calculated on the total weight of all polyurethane compounds in the resin) exhibit hydrophobic properties and at least 50 wt %, preferably at least 60 wt %, more preferably at least 70 wt %, most preferably at least 80 wt % of the reactive diluent compounds (calculated on the total weight of all reactive diluent compounds in the resin) exhibit hydrophilic properties.

According to embodiments, at least 70 wt %, more preferably at least 80 wt %, most preferably at least 90 wt % of the functionalized (end-capped) polyurethane compounds (calculated on the total weight of all polyurethane compounds in the resin) exhibit hydrophilic properties and at least 50 wt %, preferably at least 60 wt %, more preferably at least 70 wt %, most preferably at least 80 wt % of the reactive diluent compounds (calculated on the total weight of all reactive diluent compounds in the resin) exhibit hydrophobic properties.

The polarity of the curable functionalized (end-capped) polyurethane compounds in the curable polyurethane based resin of the invention is mostly defined by the nature of the polyol (isocyanate reactive) used to make the curable polyurethane compounds.

According to embodiments, the isocyanate reactive compounds used to make the curable end capped polyurethane compounds are selected from polyether polyols, polyester polyols and/or polyether-polyester polyols having a number average molecular weight ≥1000 g/mol, preferably having a number average molecular weight in the range 1500-12000 g/mol, more preferably in the range 2000-8000 g/mol, most preferably in the range 2000-4000 g/mol. The use of lower average molecular weight polyols in the range 1500-12000 g/mol, preferably 2000-8000 g/mol, more preferably 2000-4000 g/mol will be beneficial to achieve a suitable viscosity of the resin for use in SLA processes (a resin with viscosities ≤8 Pa·s at processing temperature).

According to embodiments, the isocyanate reactive compounds used to make the curable end capped polyurethane compounds are selected from polyether polyols having a low ethylene oxide (EO) content, preferably a low EO content, <50 wt %, <30 wt %, <15 wt % based on the total weight of all alkylene oxides in the polyol. An example of a suitable polyol is PolyPropylene Glycol (PPG) with a number average molecular weight in the range 1000 g/mol and 8000 g/mol.

According to embodiments, the liquid curable (cross-linkable) polyurethane based resin of the invention comprises at least one monofunctional reactive diluent compound, preferably at least 70 wt %, more preferably at least 80 wt %, most preferably at least 90 wt % of the reactive diluent compounds are monofunctional reactive diluent compounds, the remaining part of the reactive diluent compound can be difunctional or multifunctional reactive diluent compounds.

According to embodiments, at least 70 wt %, more preferably at least 80 wt %, more preferably at least 90 wt %, most preferably 100% of the reactive diluent compounds does not contain an epoxide functionality.

According to embodiments, the functionalized polyurethane compounds have a hard block content of less than 60%, preferably less than 50%, more preferably less than 40%, most preferably less than 30%.

According to embodiments, the functionalized polyurethane compounds have an average functionality (f) ≥1, more preferably ≥1.5, more preferably 1.5<f<10, more preferably 1.5<f<5, most preferably 1.5<f<2.5. Said functionality referring to the average number of reactive ethylenically unsaturated moieties in the functionalized polyurethane compounds.

According to embodiments, the functionalized polyurethane compounds have a thermally deblockable isocyanate content of <50 wt %, preferably <40 wt %, more preferably <30 wt %, more preferably <20 wt %, more preferably <10 wt %, more preferably <5 wt %, most preferably <0.1 wt % calculated on the total weight of all functionalized polyurethane compounds.

The polarity of the reactive diluent compounds in the curable/cross-linkable polyurethane based resin is defined by the nature of the reactive diluent compound itself. Examples of hydrophobic reactive diluent compounds are monofunctional and multifunctional (functionality ≥2) (meth)acrylate compounds such as isobornyl acrylate (IBOA), isobornyl methacrylate (IBOMA), tertiobutyl cyclohexyl acrylate (TBCHA), 2-Ethylhexyl acrylate (2-EHA), 4-tert-butyl cyclohexyl methacrylate (TBCHMA), Methyl acrylate (MA, MMA), 3,3,5 trimethyl cyclohexanol acrylate (TMCHA), Trimethylcyclohexyl methacrylate (TMCHMA), Dihydrodicyclopentadienyl acrylate (DCPA), . . . . Polymerized (cured) 2-EHA has a Tg below room temperature (<0° C.). Polymerized (cured) TBCHA and TMCHMA have a Tg around room temperature (20-40° C.). Polymerized (cured) IBOA, IBOMA and DCPA have a Tg above room temperature (>40° C.) in the cured state. IBOA is illustrated in formula [1].

[1]

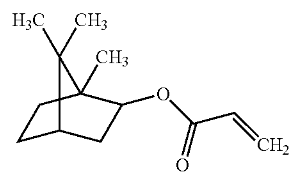

Examples of hydrophilic reactive diluent compounds are monofunctional (meth)acrylate compounds that polymerize when exposed to sources of free radicals such as Hydroxyethylmethacrylaat (HEMA), 4-Hydroxybutyl acrylate (4-HBA), Hydroxyethyl acrylate (HEA), 2-Phenoxyethyl acrylate (2-PEA), Aceto acetoxyethyl methacrylate (AAEM), Hydroxypropyl Methacrylate (HPMA), Acrylic acid, methacrylic acid, N-vinyl-N-methylacetamide, Acryloylmorpholine, diethylene glycol dimethacrylate, triethylene glycol dimethacrylate, polyethylene glycol dimethacrylate. Polymerized (cured) 4-HBA and HEA have a Tg below room temperature (<0° C.). Polymerized (cured) 2-PEA and AAEM have a Tg around room temperature (20-40° C.). Polymerized (cured) HEMA and HPMA have a Tg above room temperature (>40° C.). HEMA is illustrated in formula [2].

[2]

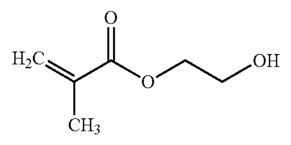

According to embodiments, a preferred reactive diluent is one in which the homopolymer of the diluent has a glass transition temperature higher than the desired 3D print temperature (with print temperatures between 10-100° C., more preferably 20-60° C.). In order to achieve the desired balance of physical properties of the final cured 3D object, it has been found that the reactive diluent needs to be present in the curable polyurethane based resin for at least 15 wt %, more preferably more than 20 wt % calculated on the total weight of the curable polyurethane based resin system. In order for the curable polyurethane based resin to be curable by ultraviolet light a photoinitiator or photosensitizer package may have to be added to the curable (cross-linkable) polyurethane based resin of the invention.

According to embodiments, a preferred set of reactive diluents (>1 reactive diluent type) is those in which the copolymer of the diluent has a glass transition temperature higher than the desired 3D print temperature (with print temperatures between 10-100° C., more preferably 20-60° C.).

According to embodiments, the viscosity of the curable polyurethane based resin of the present invention is ≤15 Pa·s, preferably ≤10 Pa·s, more preferably ≤8 Pa·s. at printing temperature (exposure to actinic radiation) from viewpoints of handling properties and properties for stereolithography. The viscosity is dependent on the printing temperature used and the molecular weight of the functionalized polyurethane compounds, type of reactive diluent used and amount of diluent used. Alternatively the viscosity of the curable polyurethane based resin of the present invention is ≤5 Pa·s. The viscosity of the curable polyurethane based resin can be adjusted by selecting kinds of the polyurethane compounds and the reactive diluent compound and controlling the blend ratio of these.

According to embodiments, the reactive ethylenically unsaturated moieties in the functionalized (end-capped) polyurethane compounds of the curable polyurethane based resin may be selected from an acrylate, methacrylate and/or vinyl group.

According to embodiments, the reactive ethylenically unsaturated moieties in the functionalized (end-capped) polyurethane compounds are selected from acrylates and/or methacrylates and combinations thereof with a functionality ≥1. Examples of such ethylenically unsaturated compounds are hydroxyethyl acrylate, hydroxyethyl methacrylate, hydroxypropyl acrylate, hydroxypropyl methacrylate, 4-hydroxybutyl acrylate, hydroxybutyl methacrylate, Polypropyleneglycol (6) Monoacrylate, Polypropyleneglycol (5) Monomethacrylate, Polyethyleneglycol (6) Monoacrylate, Polyethyleneglycol (6) Monomethacrylate, Polyalkyleneglycol (6,3) Methacrylate, 3-Phenoxy 2 hydroxy propyl methacrylate, Polycaprolactone (2) acrylate, Di-pentaerythritol pentaacrylate, pentaerythritol triacrylate, Hydroxybutyl vinyl ether, 3-Amino propyl vinyl ether.

According to embodiments, the reactive ethylenically unsaturated moieties in the functionalized (end-capped) polyurethane compounds are selected from vinyl monomers and combinations thereof with a functionality ≥1. Alkyl vinyl ethers for example can be radically copolymerized with electron-deficient ethylenically unsaturated moieties such as for example maleates. As such, hydrophobic vinyl monomers may be selected from iso-Butyl vinyl ether, Dodecyl vinyl ether and tert-Butyl vinyl ether (Tg of 88° C.). Alternatively hydrophilic vinyl monomers may be selected from vinyl Propionate and N-Vinyl-pyrrolidone. Polymerized (cured) iso-Butyl vinyl ether and Dodecyl vinyl ether have a Tg below room temperature (<0° C.). Polymerized (cured) Vinyl Propionate has a Tg around room temperature (20-40° C.). Polymerized (cured) N-Vinyl-pyrrolidone has a Tg above room temperature (>40° C.).

The functionalized (end-capped) polyurethane compounds can be synthesized through the reaction of polyisocyanates, polyols, and compounds containing reactive ethylenically unsaturated moieties (such as (meth)acrylate compounds). Alternatively they can also be synthesized through the reaction of polyols and/or amines with compounds containing a dual functionality, where at least a reactive ethylenically unsaturated moiety and an isocyanate functionality is present.

The functionalized (end-capped) polyurethane compounds may be prepared by two-step reactions. In the first step, the polyurethane oligomers are prepared by reacting an organic polyisocyanate with a mixture of isocyanate reactive polyols in an equivalent ratio of NCO:OH above 1:1 up to 25:1 (isocyanate index >100 up to 2500), using standard procedures, to yield an isocyanate-terminated prepolymer with controlled molecular weight. Any and all ranges above 1:1 up to 25:1 (isocyanate index >100 up to 2500), preferably in the range above 1:1 up to 3.6:1 (isocyanate index >100 up to 360) are included herein and disclosed herein, for example, the NCO/OH ratio can range from about 1.4:1 to about 2.3:1 (isocyanate index 140 up to 230). In the second step, polyurethane oligomers with free terminal isocyanate (NCO) groups are capped with ethylenically unsaturated functionalities (e.g. derived from (meth)acrylates) by using methods well-known in the art. The percent of free NCO (NCO value) in the final functionalized (end-capped) polyurethane compounds is preferably <0.5%, more preferably <0.1%, generally in the range of from 0 to 0.1 percent. Any and all ranges between 0 and 0.5 percent are included herein and disclosed herein, for example, the percent of free NCO in the final urethane acrylate can be in the range of from 0 to 0.001%. Alternatively, the final functionalized (end-capped) polyurethane compounds may be prepared by the so called "reverse process", in which the isocyanate is reacted first with the ethylenically unsaturated functionalities (e.g. derived from (meth) acrylate) and then with the isocyanate reactive polyols. Alternatively, a "one step process" may be adopted, in which the isocyanate is reacted simultaneously with a mixture of the isocyanate reactive polyols and the compound containing the ethylenically unsaturated functionalities.

Alternatively all of the above processes ("standard", "reverse" and "one step" process) can be combined with the addition of the reactive diluent compound(s) at any given point during the synthesis. It is well understood by those of ordinary skill in the art that the type of chosen reactive diluent compound(s) might limit the possibility of doing such addition at any given point without affecting the desired functionalized (end-capped) polyurethane compound. The reactive diluent compound(s) can be added before/after the isocyanate addition and/or before/after the polyol addition and/or before/after the addition of ethylenically unsaturated functionalities.

The isocyanates used are typically aromatic, aliphatic, and cycloaliphatic polyisocyanates with a number average molar mass below 800 g/mol. Examples of suitable compounds include, but are not limited to diisocyanates from the group of toluene 2,4-/2,6-diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate (IIPDI)), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, tetramethylxylylenediisocyanate (TMXDI), 4,6'-xylene diisocyanate (XDI), para-phenylene diisocyanate (PPDI), 3,3'-tolidene 4,4'-diisocyanate (TODI), 3,3'-dimethyl-diphenylmethane 4,4'-diisocyanate (DDI), their adducts, their polymeric forms, and also mixtures thereof. Examples of commercial available isocyanates suitable for the scope of this invention, are the aromatic isocyanates available from Huntsman under the trademark Suprasec® 1306.

According to embodiments, the polyisocyanate compounds used to form the polyurethane compounds of the photopolymerizable/curable (cross-linkable) polyurethane based resin according to the invention are preferably selected from pure 4,4'-diphenylmethane diisocyanate (4,4' MDI) or mixtures of that diisocyanate with one or more other organic polyisocyanates, especially other diphenylmethane diisocyanates (such as 2,4' MDI). The one or more polyfunctional isocyanates may also be an MDI variant derived from a polyisocyanate composition containing at least 95% by weight of 4,4'-diphenylmethane diisocyanate. Preferred polyfunctional isocyanates are those containing at least 90% by weight of 4,4'-diphenylmethane diisocyanate or its hydrogenated derivative. More preferably, the 4,4'-diphenylmethane diisocyanate content is at least 95% by weight, and most preferably at least 98% by weight.

Alternatively, the isocyanate compounds can also contain an ethylenically unsaturated functionality that can be reacted with the isocyanate reactive compound(s). Examples of suitable compounds include, but are not limited to (meth) acrylic isocyanate monomers such as 2-isocyanatoethyl Methacrylate, 2-isocyanatoethyl Acrylate, 2-[2-(Methacryloyloxy)ethyloxy] ethyl isocyanate, their adducts, their polymeric forms, and also mixtures thereof (including mixtures of isocyanate compounds with and without ethylenically unsaturated functionality). Examples of commercial available isocyanates suitable for the scope of this invention, are the aromatic isocyanates available from ShowaDenko under the trademark AOI-VM.

The invention further discloses a polymerized (cured) resin using the liquid photopolymerizable (curable) polyurethane based resin according to the invention. Said polymerized/cured resin characterized in that:

- The polymerized/cured resin gives rise to at least 2 distinctive peaks in Tan delta as measured by Dynamic Mechanical Analysis (DMA) according to ISO 6721-4,
- At least 1 peak of the at least 2 distinctive peaks in Tan delta is originating from at least 70 wt % functionalized polyurethane compounds in the uncured resin (calculated on the total weight of all functionalized polyurethane compounds in the unpolymerized/uncured resin and said functionalized polyurethane compounds have a glass transition temperature $T_{g1}$ in the polymerized/cured state of the resin,
- At least 1 peak of the at least 2 distinctive peaks in Tan delta is originating from at least 50 wt % of the reactive diluent compounds in the unpolymerized/uncured resin (calculated on the total weight of all reactive diluent compounds in the unpolymerized/uncured resin and said reactive diluent compounds have a glass transition temperature $T_{g2}$ in the polymerized/cured (solid) state of the resin,
- $T_{g2}-T_{g1}$ ($\Delta T_g$) is at least 20° C., more preferably 50° C. and most preferred 100° C., and
- $T_{g2}$ is above the temperature of use of the polymerized/cured resin According to embodiments, the cured resin according to the invention (made using the liquid polymerizable/curable polyurethane based resin according to the invention) is having elongation at break values of >100%, preferably >150% and a tensile strength of >5 MPa, preferably >10 MPa. The polymerized/cured resins are preferably 3D printed objects using additive manufacturing printing techniques such as SLA. Alternatively the polymerized/cured resins are films, sheets or coatings.

According to a further goal of the invention a method of manufacturing (printing) a three-dimensional (3D) object is disclosed thereby using the liquid photopolymerizable/curable polyurethane based resin according to the invention. Said method comprising:

- Providing the liquid photopolymerizable/curable polyurethane based resin according to the invention in a liquid state in a container;
  - Selectively exposing the resin in the container to actinic radiation to polymerize/cure (solidify) at least a portion of a first liquid layer of the resin, thereby forming a first polymerized/cured (solidified) layer that defines a first cross-section of the 3D object;
- Raising or lowering the first polymerized/cured (solidified) layer to provide a second photopolymerizable (liquid) layer of the resin at a surface of the photopolymerizable (liquid) resin in the container; and
- Selectively applying energy to the resin in the container to photopolymerize (solidify) at least a portion of the second photopolymerizable (liquid) layer of the resin, thereby forming a second polymerized (solidified) layer that defines a second cross-section of the 3D object, the first cross-section and the second cross-section being bonded to one another in a z-direction.

According to embodiments, the step of selectively applying energy implies exposing the resin to actinic radiation and leads to cross-linking (photopolymerization/curing) of the compounds in the photopolymerizable/curable polyurethane based resin leading to solidification of the resin. The actinic radiation may be selected from UV radiation, visible light radiation and/or electron beam (EB) radiation.

According to embodiments, the step of selectively applying energy to the resin is performed by photochemical processes by which a light source causes chemical compounds in the liquid polymer resin to link (photopolymerize) together to form polymers. The light source is preferably selected from a laser and/or UV and/or visible light.

According to embodiments, the step of providing the liquid photopolymerizable/curable polyurethane based resin according to the invention in a liquid state in a container is performed at a temperature in the range of −20 up to 100° C., preferably 10-80° C., most preferably 15-60° C. (also referred to as the printing temperature). Alternatively the step of providing the liquid photopolymerizable/curable (cross-linkable) polyurethane based resin in a liquid state in a container is performed at a temperature in the range of 100 up to 200° C.

The independent and dependent claims set out particular and preferred features of the invention. Features from the dependent claims may be combined with features of the independent or other dependent claims as appropriate.

The above and other characteristics, features and advantages of the present invention will become apparent from the above detailed description, taken in conjunction with the accompanying examples which illustrate, by way of example, the principles of the invention.

FIGURES

In all FIGS. 1-8, the dotted line shows the temperature of use ($T_{use}$) of the cured resin which is corresponding to room temperature (around 23° C.) and also corresponding to the temperature at which the tensile strength and elongation are determined on the cured samples.

FIG. 1 illustrates the DMTA curve of a cured polyurethane-based resin not according to the invention (corresponding to the cured resin material A in the examples) that shows no phase separation due to the good compatibility of the photopolymerizable/curable (cross-linkable) polyurethane and reactive diluent phase. The resulting material will therefore only show 1 glass transition temperature, as shown in the single peak in tan delta during the DMTA measurement.

Figure 2:
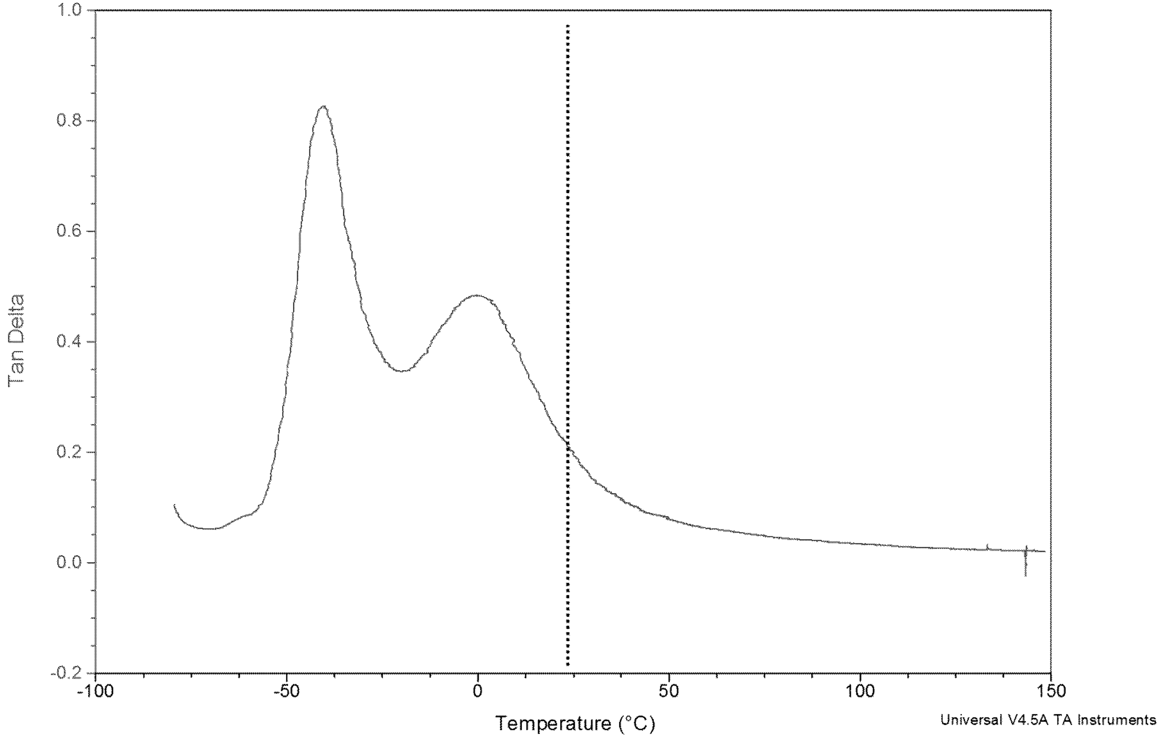

FIG. 2 illustrates the DMTA curve of a polymerized/cured polyurethane based resin not according to the invention (corresponding to the cured resin material B in the examples) that does show good phase separation due to the incompatibility of the curable (cross-linkable) polyurethane and reactive diluent phase, but where $T_{use}$>$Tg_2$ (instead of $T_{use}$<$Tg_2$ as described by the invention). The resulting material will therefore show 2 glass transition temperatures as shown by the two peaks in tan delta during the DMTA measurement, but still lack good physical properties.

Figure 3:
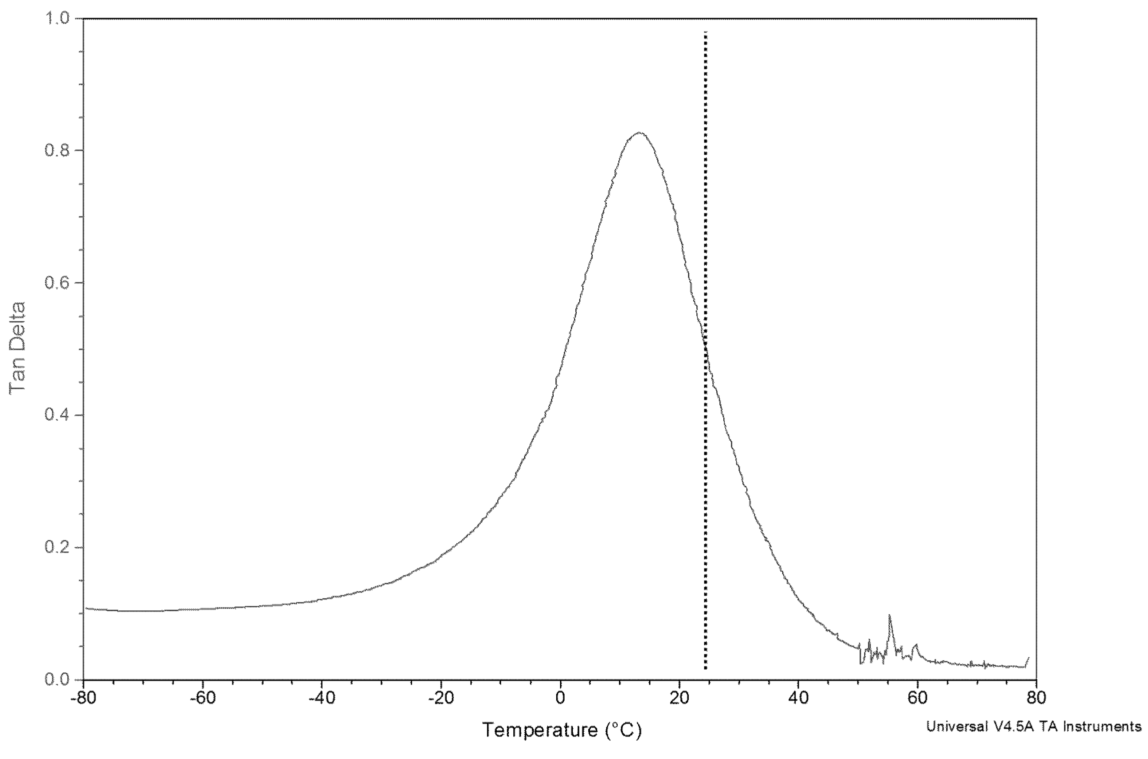
Figure 4:
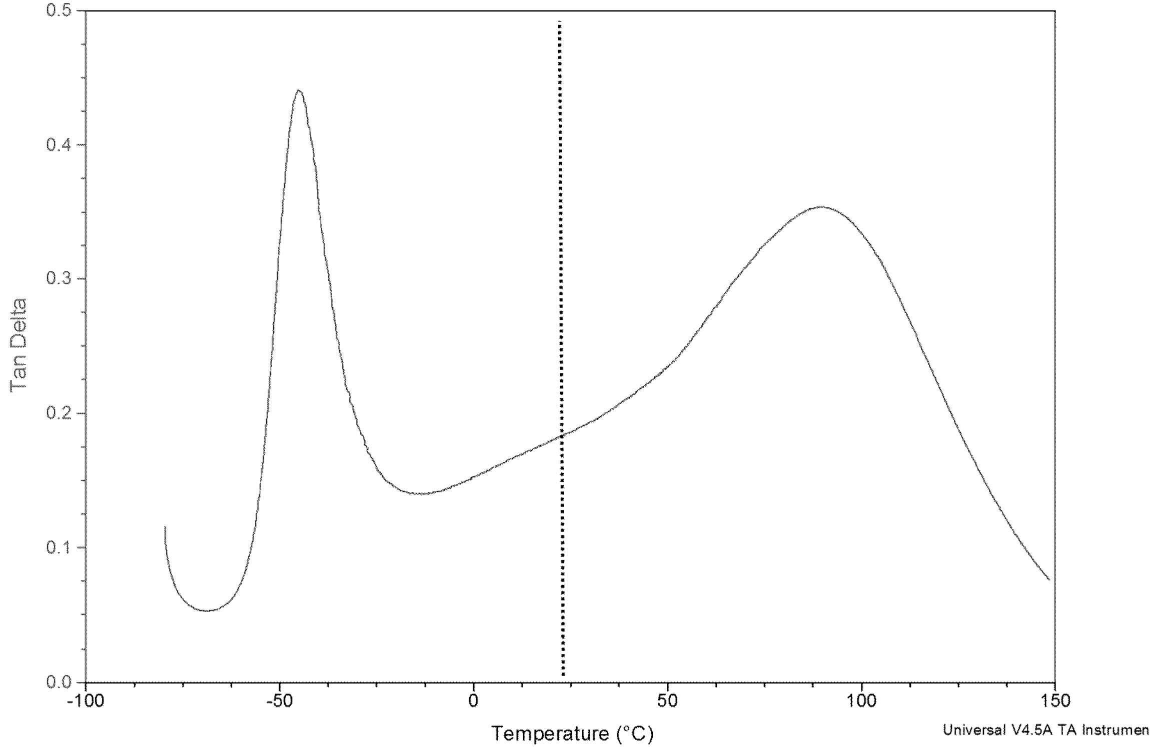
Figure 5:
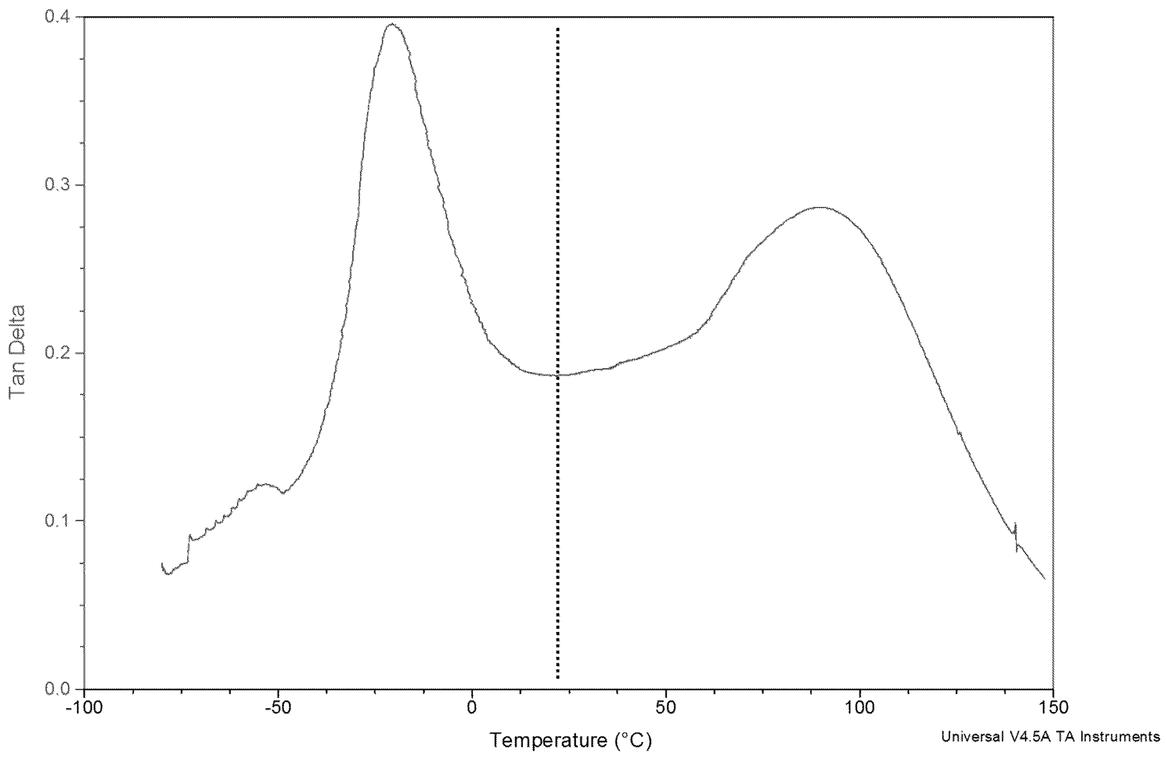
Figure 6:
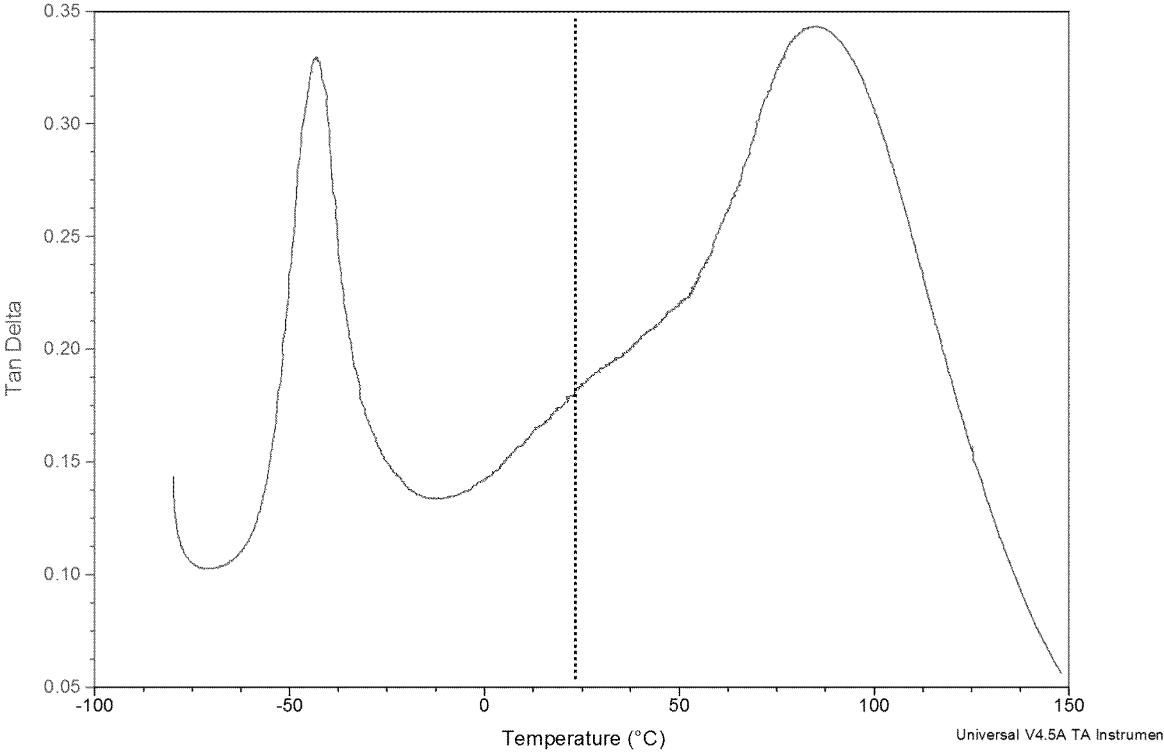
Figure 7:
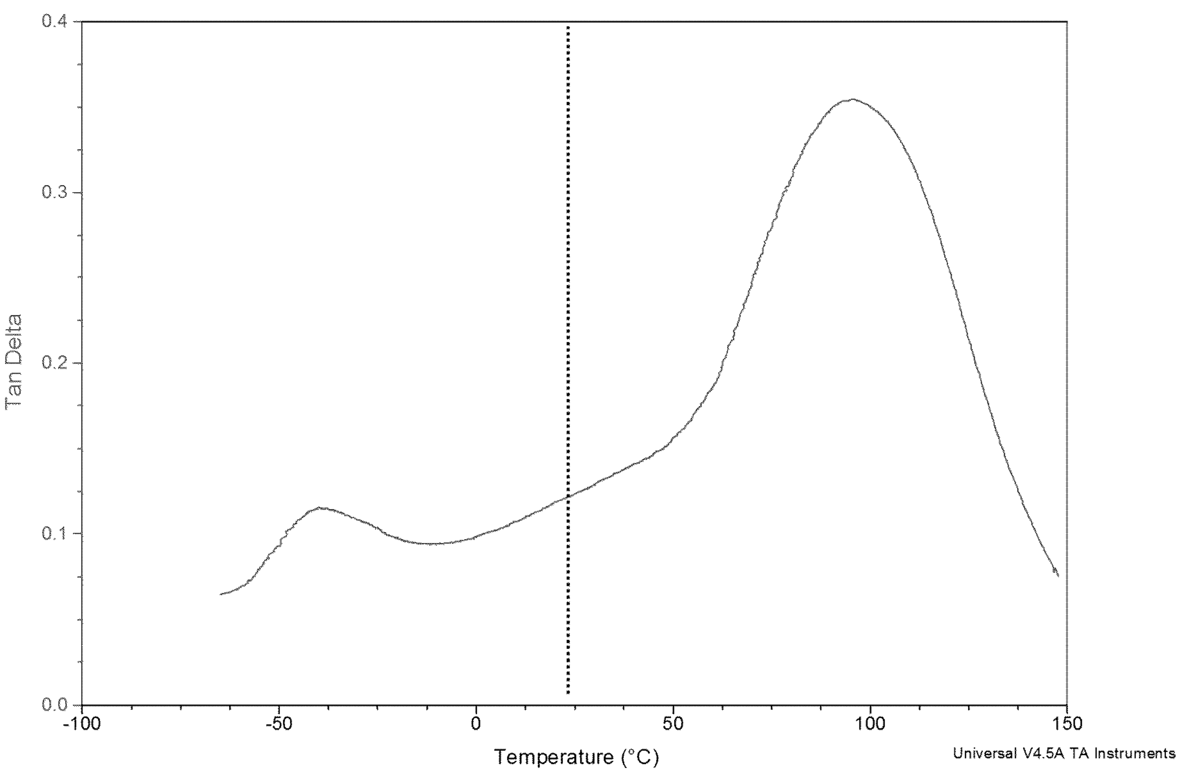
Figure 8:
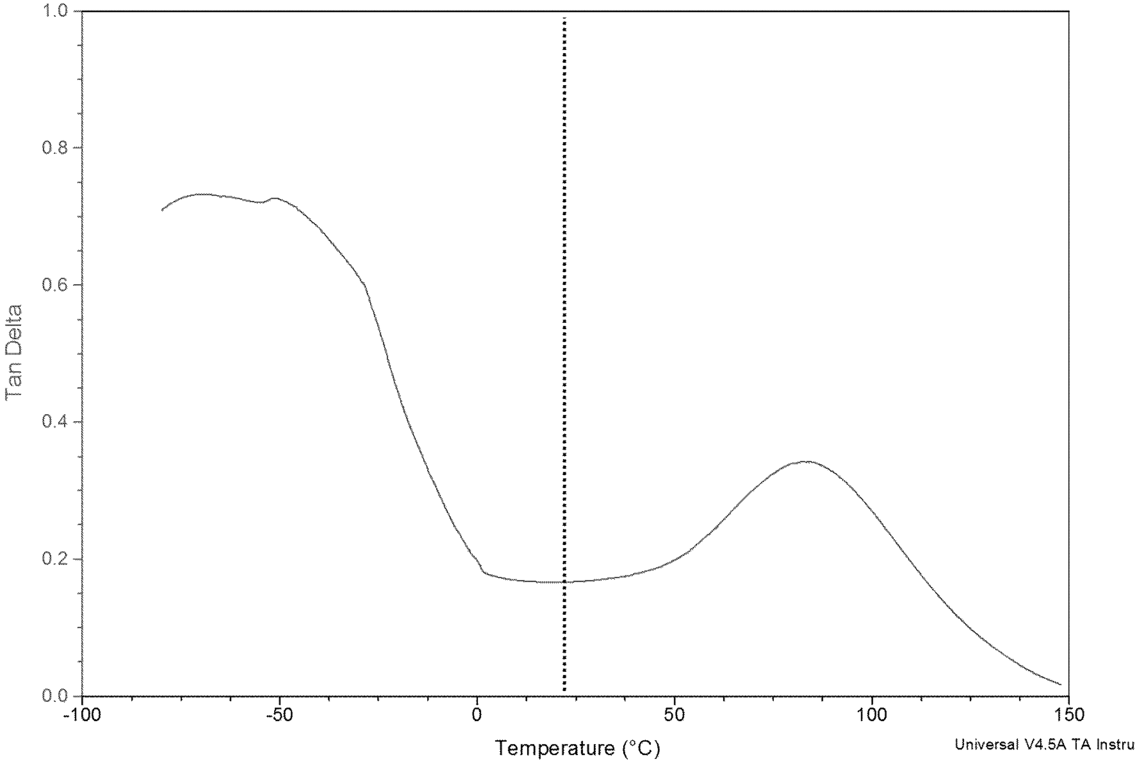

FIG. 3 illustrates the DMTA curve of a polymerized/cured polyurethane-based resin not according to the invention (corresponding to the cured resin material C in the examples) that shows no phase separation due to the good compatibility of the curable (cross-linkable) polyurethane and reactive diluent phase. The resulting material will therefore only show 1 glass transition temperature, as shown in the single peak in tan delta during the DMTA measurement.

FIGS. 4 to 8 illustrate the DMTA curve of a polymerized/cured polyurethane based resin according to the invention (corresponding to the cured resin materials D-H in the examples) that does show good phase separation due to the incompatibility of the curable (cross-linkable) polyurethane and reactive diluent phase, and where $T_{use}$<$Tg_2$ as described by the invention. The resulting material will therefore show 2 glass transition temperatures as shown by the two peaks in tan delta during the DMTA measurement.

Figure 9:
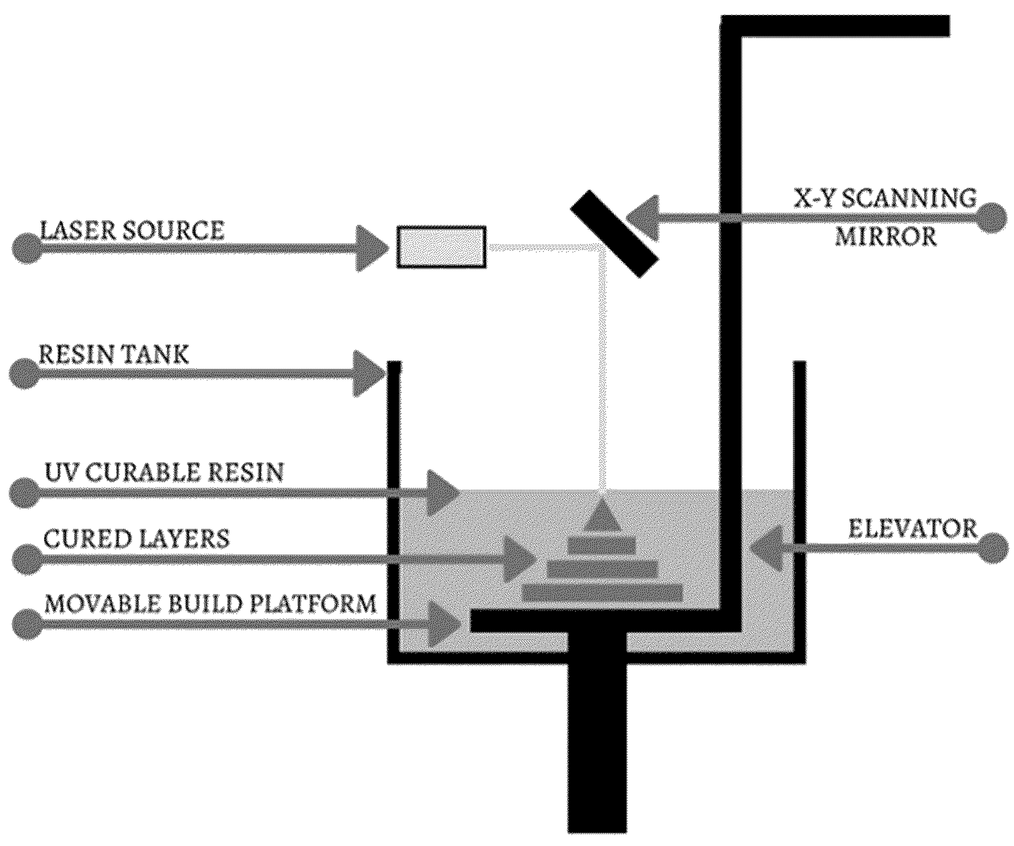

FIG. 9 illustrates an example of an SLA printing device suitable for use of the liquid photopolymerizable/curable polyurethane-based resins of the invention to print 3D objects.

EXAMPLES

Chemicals used:

- Suprasec® 1306 (S1306): 4,4'-MDI polyisocyanate with NCO-value of 33.5% with a number average molecular weight of 250 g/mol from Huntsman
- Irganox® 1010: Antioxidant from BASF
- Caradol® ED56-200: polypropyleneglycol with OHv=57 and theoretical functionality of 2 from Shell
- Daltocel® XF460: EO tipped polypropyleneglycol with OHv=30 and theoretical functionality of 2 from Huntsman
- Daltocel® XF481: EO tipped polypropyleneglycol with OHv=30 and theoretical functionality of 2 from Huntsman
- PTHF1400: Terathane® 1400, Polytetramethyleneglycol (PTMEG) with Ohv=80 and theoretical functionality of 2 from Invista
- PPA6: Bisomer® PPA6, polypropyleneglycol monoacrylate from Geo Specialty Chemicals: end-capper
- Benzoyl chloride from Sigma Aldrich: acid
- Valikat® Bi2010: polyurethane catalyst from Umicore
- Irgacure® 819, Bis(2,4,6-trimethylbenzoyl)-phenylphosphineoxide (BAPO), a photoinitiator for radical polymerization from BASF
- Repitan® 99430: Carbon black liquid dispersion (colorant) from REPI
- Carbo Protec: UV absorber from BASF
- 2-EHA: 2-Ethylhexyl acrylate from Arpadis: reactive diluent
- HEMA: Bisomer® HEMA, Hydroxyethylmethacrylaat from Geo Specialty Chemicals: reactive diluent or end-capper
- HPMA: Bisomer® HPMA, Hydroxypropyl Methacrylate from Geo Specialty Chemicals: reactive diluent or end-capper
- 4-HBA: 4-Hydroxybutyl acrylate from BASF: reactive diluent or end-capper
- Formlabs Elastic resin from Formlabs Preparation Polyol Masterbatches A masterbatch is prepared for all of the following polyols by the addition of the antioxidant Irganox® 1010 to allow better processing and provide long term thermal stabilization:

- Daltocel® XF460 masterbatch 32 99,53 w % Daltocel® XF460+0,47 w % Irganox® 1010
- Daltocel® XF481 masterbatch=99,53 w % Daltocel® XF481+0,47 w % Irganox® 1010
- PTHF1400 masterbatch=99,53 w % PTHF1400+0,47 w % Irganox® 1010
- Caradol® ED56-200 masterbatch=99,53 w % Caradol® ED56-200+0,47 w % Irganox® 1010

Preparation Functionalized Polyurethane-based Compounds

Examples PUAC1 up to PUAC5 describe the preparation of the functionalized polyurethane-based compounds used to make the liquid curable (cross-linkable) polyurethane-based resins in examples A-H.

Example PUAC1

89,94 grams of Suprasec® 1306 is added in a 1500 ml reactor and heated to 60° C. under a nitrogen blanket. The mixture is stirred using an overhead stirrer. The isocyanate is acidified up to a level of 12 ppm using benzoyl chloride (calculated on the total amount of isocyanate). Then 291,35 grams of Daltocel® XF460 masterbatch are slowly added to the mixture to ensure the exotherm stays below 85° C. Then 100 ppm (calculated on the final PUAC weight) of urethane catalyst Valikat® Bi2010 is added to the mixture in such way that the exotherm stays below 85° C. The remaining polyol, 582,7 grams of Daltocel® XF460 masterbatch, is then added to the mixture. The reactor is then kept at 80° C. for at least 60 minutes. The end-capper HPMA is pre-heated to 60° C. and 36 grams is slowly added to the reactor in such way that the exotherm stays below 85° C. The mixture is then cooked for at least 60 minutes at 80° C. The material is then checked for any residual NCO-groups using ATR-FTIR and unloaded from the reactor once the NCO value is <0,5%. The obtained resin is then stored overnight at 50° C. before it is used.

Example PUAC2

138,49 grams of Suprasec® 1306 is added in a 1500 ml reactor and heated to 60° C. under a nitrogen blanket. The mixture is stirred using an overhead stirrer. The isocyanate is acidified up to a level of 12 ppm using benzoyl chloride (calculated on the total amount of isocyanate). Then 231,17 grams of Caradol® ED56-200 masterbatch are slowly added to the mixture to ensure the exotherm stays below 85° C. Then 100 ppm (calculated on the final PUAC weight) of urethane catalyst Valikat® Bi2010 is added to the mixture in such way that the exotherm stays below 85° C. The remaining polyol, 462,34 grams of Caradol® ED56-200 masterbatch, is then added to the mixture. The reactor is then kept at 80° C. for at least 60 minutes. The end-capper PPA6 is pre-heated to 60° C. and 168 grams is slowly added to the reactor in such way that the exotherm stays below 85° C. The mixture is then cooked for at least 60 minutes at 80° C. The material is then checked for any residual NCO-groups using ATR-FTIR and unloaded from the reactor once the NCO value is <0,5%. The obtained resin is then stored overnight at 50° C. before it is used.

Example PUAC3

106,21 grams of Suprasec® 1306 is added in a 1500 ml reactor and heated to 60° C. under a nitrogen blanket. The mixture is stirred using an overhead stirrer. The isocyanate is acidified up to a level of 12 ppm using benzoyl chloride (calculated on the total amount of isocyanate). Then 278,73 grams of Daltocel® XF481 masterbatch are slowly added to the mixture to ensure the exotherm stays below 85° C. Then 100 ppm (calculated on the final PUAC weight) of urethane catalyst Valikat® Bi2010 is added to the mixture in such way that the exotherm stays below 85° C. The remaining polyol, 557,46 grams of Daltocel® XF481 masterbatch, is then added to the mixture. The reactor is then kept at 80° C. for at least 60 minutes. The end-capper HPMA is pre-heated to 60° C. and 57,6 grams is slowly added to the reactor in such way that the exotherm stays below 85° C. The mixture is then cooked for at least 60 minutes at 80° C. The material is then checked for any residual NCO-groups using ATR-FTIR and unloaded from the reactor once the NCO value is <0,5%. The obtained resin is then stored overnight at 50° C. before it is used.

Example PUAC4

185,48 grams of Suprasec® 1306 is added in a 1500 ml reactor and heated to 60° C. under a nitrogen blanket. The mixture is stirred using an overhead stirrer. The isocyanate is acidified up to a level of 12 ppm using benzoyl chloride (calculated on the total amount of isocyanate). Then 252,3 grams of PTHF1400 masterbatch are slowly added to the mixture to ensure the exotherm stays below 85° C. Then 100 ppm (calculated on the final PUAC weight) of urethane catalyst Valikat® Bi2010 is added to the mixture in such way that the exotherm stays below 85° C. The remaining polyol, 504,62 grams of PTHF1400 masterbatch, is then added to the mixture. The reactor is then kept at 80° C. for at least 60 minutes. The end-capper HPMA is pre-heated to 60° C. and 57,6 grams is slowly added to the reactor in such way that the exotherm stays below 85° C. The mixture is then cooked for at least 60 minutes at 80° C. The material is then checked for any residual NCO-groups using ATR-FTIR and unloaded from the reactor once the NCO value is <0,5%. The obtained resin is then stored overnight at 50° C. before it is used.

Example PUAC5

150,97 grams of Suprasec® 1306 is added in a 1500 ml reactor and heated to 60° C. under a nitrogen blanket. The mixture is stirred using an overhead stirrer. The isocyanate is acidified up to a level of 12 ppm using benzoyl chloride (calculated on the total amount of isocyanate). Then 263,81 grams of Caradol® ED56-200 masterbatch are slowly added to the mixture to ensure the exotherm stays below 85° C. Then 100 ppm (calculated on the final PUAC weight) of urethane catalyst Valikat® Bi2010 is added to the mixture in such way that the exotherm stays below 85° C. The remaining polyol, 527,62 grams of Caradol® ED56-200 masterbatch, is then added to the mixture. The reactor is then kept at 80° C. for at least 60 minutes. The end-capper HPMA is pre-heated to 60° C. and 57,6 grams is slowly added to the reactor in such way that the exotherm stays below 85° C. The mixture is then cooked for at least 60 minutes at 80° C. The material is then checked for any residual NCO-groups using ATR-FTIR and unloaded from the reactor once the NCO value is <0,5%. The obtained resin is then stored overnight at 50° C. before it is used.

Preparation Liquid Curable (Cross-Linkable) Polyurethane-Based Resins

Examples A up to H are made using the ingredients provided in table 1. The PUAC compounds are first heated to 80° C. and the required amount (visible in table 1 below) is transferred to a recipient. Then the according amount of reactive diluent, photoinitiator, colorant and UV-absorber is added to the recipient. The material is then thoroughly mixed and stored overnight at 60° C. before it is used.

Alternatively example C is used as is, namely the commercially available Formlabs Elastic resin.

UV Curing

The obtained materials A-H were 3D printed using a Formlabs Form2 printer using the specified print settings (see table 2) to print a bar (for DMTA measurements, dimensions are 2,5×53×11 mm) and tensile test specimen (DIN53504 S2). The printing temperature is always room temperature unless otherwise specified. In case of material C (Formlabs elastic resin) the available preset settings of the specific material are used as provided by the Form 2 software (including laser setting, print temperature, . . . ). After printing the objects were washed in isopropanol (IPA) (2 washing cycles of 10 minutes) and left to dry. The isopropanol washing cycles start after the excess resin could freely drip from the part, submerging the sample for 10 min in IPA, cleaning the excess IPA with dissolved resin, submerging the sample again for 10 min in IPA and finally placing the sample in a container with pure IPA and shaking vigorously to remove the last amount of residual resin. After a waiting time of at least 1 week the samples were post-cured using a UV-belt system (using a Fusion UV system LC6E equipped with a Fusion 1300 & 16 ultraviolet lamp, see WO 2012/004088 for full description and composition of the UV light), samples were faced flat (for the bar this is the 53×11 mm side) and top and bottom side surface were irradiated using 4 passes at 5 m/min for each side. Thereafter the samples are analyzed to obtain the material properties (see Table 1 below).

| | Material | A | B | C | D | E | F | G | H |
|---|---|---|---|---|---|---|---|---|---|
| Composition [PBW] | PUAC1 | 66.1 | 66.1 | | 66.1 | | | | |
| | PUAC2 | | | | | 66.1 | | | |
| | PUAC3 | | | | | | 59.5 | | |
| | PUAC4 | | | | | | | 54.1 | |
| | PUAC5 | | | | | | | | 66.1 |
| | Formlabs Elastic resin | | | 100 | | | | | |
| | 2-EHA | 33.05 | | | | | | | |
| | 4-HBA | | 33.05 | | | | | | |
| | HEMA | | | | 33.05 | 33.05 | 39.7 | 45.1 | |
| | HPMA | | | | | | | | 33.05 |
| | Repitan 99430 | 0.05 | 0.05 | | 0.05 | 0.05 | 0.05 | 0.05 | 0.05 |
| | Carbo protec | 0.05 | 0.05 | | 0.05 | 0.05 | 0.05 | 0.05 | 0.05 |
| | Irgacure 819 | 0.75 | 0.75 | | 0.75 | 0.75 | 0.75 | 0.75 | 0.75 |
| DMTA Info | ≥2 tan δ peaks DMTA | NO | YES | NO | YES | YES | YES | YES | YES |
| | $T_{use} < Tg_2$ | NO | NO | NO | YES | YES | YES | YES | YES |
| Print settings | Laser speed | 1275 | 1275 | | 1275 | 1275 | 1275 | 1275 | 1275 |
| | # passes first layer | 35 | 25 | | 35 | 35 | 25 | 25 | 25 |
| | # passes early layers | 6 | 4 | | 6 | 8 | 4 | 5 | 5 |
| | # passes standard layers | 6 | 4 | | 6 | 8 | 4 | 5 | 5 |
| Physical properties | stress at max load [kPa] | 600 | 840 | 2000 | 8750 | 8340 | 8780 | 16239 | 10400 |
| | Elongation [%] | 120 | 110 | 110 | 258 | 135 | 195 | 130 | 164 |
| | viscosity at 35° C. [Pa · s] | 3.6 | 6.5 | 2.5 | 5.2 | 3.9 | 3.8 | 9.6 | 4.8 |

DMTA Curves of Cured Resins (Materials A-H)

The different DMTA curves for the cured resins for materials A-H are shown in FIGS. 1-8. The temperature of use ($T_{use}$) of the provided materials is, in this case, room temperature (around 23° C.) which is also corresponding to the temperature at which the tensile strength and elongation are determined. The $T_{use}$ is therefore shown as a dotted line in all of the DMTA curves since $T_{use}<T_{g2}$ according to the invention. The info from the DMTA is also summarized in table 1 and shows that material A-C are not according to the invention and show poor physical properties (in general this corresponds to low stress at max load and/or elongation). Materials D-H, as shown in table 1 are according to the invention and show the good physical properties as described in the invention.

FIG. 1 illustrates the DMTA curve of a cured polyurethane-based resin using material A (not according to the invention) that shows no phase separation due to the good compatibility of the curable (cross-linkable) polyurethane and reactive diluent phase. The resulting material A will therefore only show 1 glass transition temperature, as shown in the single peak in tan delta during the DMTA measurement.

FIG. 2 illustrates the DMTA curve of a cured polyurethane based resin using material B (not according to the invention) that does show good phase separation due to the incompatibility of the curable (cross-linkable) polyurethane and reactive diluent phase, but where $T_{use}>Tg_2$ (instead of $T_{use}<Tg_2$ as described by the invention). The resulting material will therefore show 2 glass transition temperatures as shown by the two peaks in tan delta during the DMTA measurement, but still lack good physical properties.

FIG. 3 illustrates the DMTA curve of a cured polyurethane-based using material C (not according to the invention) that shows no phase separation due to the good compatibility of the curable (cross-linkable) polyurethane and reactive diluent phase. The resulting material will therefore only show 1 glass transition temperature, as shown in the single peak in tan delta during the DMTA measurement.

FIGS. 4 to 8 illustrates the DMTA curve of a cured polyurethane based resin using material D-H (according to the invention) that does show good phase separation due to the incompatibility of the curable (cross-linkable) polyurethane and reactive diluent phase, and where $T_{use}<Tg_2$ as described by the invention. The resulting material will therefore show 2 glass transition temperatures as shown by the two peaks in tan delta during the DMTA measurement. Because the tan delta at the temperature of use is sufficiently low, an elastic response can be expected from the material. The material made will also provide good physical properties.

The invention claimed is:

1. A liquid photopolymerizable polyurethane based resin having a viscosity of less than 15 Pa·s measured according to ASTM D445-11a at 35° C. which is polymerizable by exposure to actinic radiation, said resin comprising a) functionalized polyurethane compounds wherein the compounds are functionalized with reactive ethylenically unsaturated moieties, b) at least one reactive diluent compound having at least one ethylenically unsaturated functional group and c) at least one photo-initiator, wherein the at least one reactive diluent compounds comprise a diluent selected from (i) isobornyl acrylate (IBOA), isobornyl methacrylate (IBOMA), tertisobutyl cyclohexyl acrylate (TBCHA), 4-tert-butyl cyclohexyl methacrylate (TBCHMA), 3,3,5 trimethyl cyclohexanol acrylate (TMCHA), trimethylcyclohexyl methacrylate (TMCHMA), dihydrodicyclopentadienyl acrylate (DCPA) and combinations thereof or (ii) hydroxyethylmethacrylate (HEMA), hydroxypropyl methacrylate (HPMA), acrylic acid, methacrylic acid, N-vinyl-N-methylacetamide, acryloylmorpholine, diethylene glycol dimethacrylate, triethylene glycol dimethacrylate, polyethylene glycol dimethacrylate and combinations thereof, wherein at least 60 wt % of the functionalized polyurethane compounds have a number average molecular weight in the range of 3000-12000 g/mol, wherein the amount and choice of functionalized polyurethane compounds and reactive diluent compounds is such that by exposing actinic radiation to the resin, phase separation occurs during photopolymerization of the resin.

2. The resin according to claim 1, wherein the at least 2 distinctive peaks has ≤3 distinctive peaks in Tan delta in function of temperature as measured by Dynamic Mechanical Analysis (DMA) according to ISO 6721-4 in the polymerized state.

3. The resin according to any of claim 1, wherein the at least 70 wt % of the functionalized polyurethane compounds exhibit hydrophobic properties in the unpolymerized and/or partially polymerized and/or fully polymerized state and at least 50 wt % of the reactive diluent compounds exhibit hydrophilic properties in the unpolymerized and/or partially polymerized and/or fully polymerized state.

4. The resin according to any of claim 1, wherein the at least 70 wt % of the functionalized polyurethane compounds exhibit hydrophilic properties in the unpolymerized and/or partially polymerized and/or fully polymerized state and at least 50 wt % of the reactive diluent compounds exhibit hydrophobic properties in the unpolymerized and/or partially polymerized and/or fully polymerized state.

5. The resin according to claim 1, wherein at least 70 wt % of the functionalized polyurethane compounds, calculated on the total weight of all functionalized polyurethane compounds in the resin, are end-capped with reactive ethylenically unsaturated moieties.

6. The resin according to claim 1, wherein the resin comprises at least 50 wt % functionalized polyurethane compounds calculated on the total weight of all compounds in the curable resin and 15 up to 50 wt % of reactive diluent compounds calculated on the total weight of all compounds in the photopolymerizable resin.

7. The resin according to claim 1, wherein the viscosity of resin at the exposure to actinic radiation temperature ($T_p$) is below 15 Pa·s.

8. The resin according to claim 1, wherein the viscosity of resin at the exposure to actinic radiation temperature ($T_p$) is ≤5-Pa·s.

9. The resin according to claim 1, wherein the resin comprises at least one photo crosslinking initiator and optionally at least one thermal initiator in a concentration of 0.01 wt % up to 10 wt % calculated on the total weight of the resin.

10. The resin according to claim 1, wherein at least 70 wt % of the functionalized polyurethane compounds, calculated on the total weight of all polyurethane compounds in the resin, have a number average molecular weight in the range of 3000-12000 g/mol.

11. The resin according to claim 1, wherein at least 70 wt % of the functionalized polyurethane compounds have a number average molecular weight in the range of 5000-12000 g/mol.

12. The resin according to claim 1, wherein at least 70 wt % of the functionalized polyurethane compounds have a number average molecular weight in the range of 4000-9000 g/mol.

13. The resin according to claim 1, wherein the isocyanate reactive compounds used to make the functionalized polyurethane compounds are selected from polyether polyols, polyester polyols and/or polyether-polyester polyols having a number average molecular weight ≥1500 g/mol.

14. The resin according to claim 1, wherein the isocyanate reactive compounds used to make the functionalized polyurethane compounds are selected from polyether polyols having an EO content of <50 wt %, <30 wt %, or <15 wt % based on the total weight of all alkylene oxides in the polyol.

15. The resin according to claim 1, wherein at least 70 wt % of the reactive diluent compounds are monofunctional reactive diluent compounds, the remaining part of the reactive diluent compounds having a functionality ≥2.

16. The resin according to claim 1, wherein the functionalized polyurethane compounds have a hard block content of less than 60.

17. The resin according to claim 1, wherein the functionalized polyurethane compounds have a number average functionality (f) in reactive ethylenically unsaturated moieties ≥1.

18. The resin according to claim 1, wherein the functionalized polyurethane compounds have a thermally deblockable isocyanate content of <50 wt % calculated on the total weight of all functionalized polyurethane compounds.

19. The resin according to claim 1, wherein the reactive diluent compounds are selected from hydrophobic reactive diluent compounds.

20. The resin according to claim 1, wherein the reactive diluent compounds are selected from hydrophilic reactive diluent compounds.

21. The resin according to claim 1, wherein functionalized polyurethane compounds are functionalized with reactive ethylenically unsaturated moieties selected from acrylate, methacrylate and/or vinyl groups.

22. A polymerized resin made with the liquid photopolymerizable polyurethane based resin according to claim 1, said polymerized resin characterized in that:

the polymerized resin gives rise to at least 2 distinctive peaks in Tan delta as measured by Dynamic Mechanical Analysis (DMA) according to ISO 6721-4, at least 1 peak of the at least 2 distinctive peaks in Tan delta is originating from at least 70 wt % functionalized polyurethane compounds in the unpolymerized resin, calculated on the total weight of all functionalized polyurethane compounds in the unpolymerized resin, and said functionalized polyurethane compounds have a glass transition temperature $T_{g1}$ in the polymerized state of the resin, at least 1 peak of the at least 2 distinctive peaks in tan delta is originating from at least 50 wt % of the reactive diluent compounds in the unpolymerized resin, calculated on the total weight of all reactive diluent compounds in the unpolymerized resin, and said reactive diluent compounds have a glass transition temperature $T_{g2}$ in the polymerized state of the resin, $$T_{g2} - T_{g1}(\Delta T_g) \text{ is at least } 20^\circ \text{ C., and}$$

$T_{g2}$ is above the temperature of use ($T_{use}$) of the polymerized resin.

23. The polymerized resin according to claim 22, having a Tan delta as measured on the polymerized resin by DMA at the temperature of use ($T_{use}$)<1.

24. The polymerized resin according to claim 22, having an elongation at break value of >100% and a tensile strength of >5 MPa, both measured according to DIN 53504 S2.

25. A method of printing a three-dimensional (3D) object thereby using the liquid photopolymerizable polyurethane based resin according to claim 1, said method comprising at least following steps:

providing a photopolymerizable polyurethane based resin according to claim 1 in a fluid state in a container;

selectively exposing the resin in the container to actinic radiation to polymerize at least a portion of a first liquid layer of the resin, thereby forming a first polymerized layer that defines a first cross-section of the 3D object;

raising or lowering the first polymerized layer to provide a second liquid layer of the resin at a surface of the liquid resin in the container; and selectively exposing the resin in the container to actinic radiation to polymerize at least a portion of the second liquid layer of the resin, thereby forming a second polymerized layer that defines a second cross-section of the 3D object, the first cross-section and the second cross-section being bonded to one another in a z-direction.

26. The method according to claim 25, wherein the step of selectively exposing the resin to actinic radiation is selected from exposure to UV, visible light and/or electron beam (EB) radiation.

27. A 3D printed object made according to claim 25, having elongation at break values of >100% and a tensile strength of >5 MPa, both measured according to DIN 53504 S2.

* * * * *